United States Patent [19]

Eldridge

[11] Patent Number: 5,717,392
[45] Date of Patent: Feb. 10, 1998

[54] POSITION-RESPONSIVE, HIERARCHICALLY-SELECTABLE INFORMATION PRESENTATION SYSTEM AND CONTROL PROGRAM

[76] Inventor: Marty Eldridge, 4141 Clairemont Mesa Blvd., San Diego, Calif. 92117

[21] Appl. No.: 645,479

[22] Filed: May 13, 1996

[51] Int. Cl.$^6$ .................................. G08G 1/123
[52] U.S. Cl. ............... 340/996; 340/995; 340/988; 340/990; 364/449.2; 364/449.5; 364/449.7
[58] Field of Search ................. 340/996, 995, 340/988, 990; 364/449.5, 449.7, 449.2

[56] References Cited

U.S. PATENT DOCUMENTS

| | | | |
|---|---|---|---|
| 4,190,819 | 2/1980 | Burgyan | 340/996 |
| 4,827,420 | 5/1989 | Musa | 364/449.2 |
| 5,452,217 | 9/1995 | Kishi et al. | 364/449.1 |
| 5,493,498 | 2/1996 | Miyoshi | 364/449.2 |
| 5,541,845 | 7/1996 | Klein | 364/449.1 |
| 5,550,743 | 8/1996 | Kyrtsos | 364/449.7 |
| 5,552,989 | 9/1996 | Bertrand | 364/443 |
| 5,559,707 | 9/1996 | DeLorme et al. | 364/443 |
| 5,614,898 | 3/1997 | Kamiya et al. | 340/995 |

*Primary Examiner*—Jeffery Hofsass
*Assistant Examiner*—Benjamin C. Lee
*Attorney, Agent, or Firm*—Karl M. Steins

[57] ABSTRACT

A position-responsive information presentation system and control is disclosed. The disclosed system and control program automatically provides multimedia output that is responsive to a users location, speed, acceleration, and directional orientation. Also disclosed is a system that receives position information from various systems, including satellite global position systems. As disclosed, the system and control program may provide video, audio and tactile outputs to users.

17 Claims, 4 Drawing Sheets

POSITION-RESPONSIVE, HIERARCHICALLY-SELECTABLE INFORMATION PRESENTATION SYSTEM AND CONTROL PROGRAM

BACKGROUND OF THE INVENTION

1. Field of the Invention

This invention relates generally to mobile information display system and, more specifically, to a position-responsive, hierarchically-selectable information presentation system and its control program.

2. Description of Related Art

Information display systems that are responsive to the user's position are widely available for a number of applications. One particular system that is known is a system that provides audio or visual information when a user trips a pre-established trigger. An example of this type of system has been in use in museums, zoos and the like. The museum-type system typically comprises audio speakers located in the vicinity of various displays throughout the building. When a patron approaches a particular display close enough to trigger some sort of proximity switch, the audio speaker begins to emit a pre-recorded explanation of various information pertinent to the display. The capability of presenting detailed, consistent information to an interested patron is very powerful, in that it optimizes the amount of information that can be imparted to the patrons, without incurring the high cost of employing human tour guides for each group of patrons that passes through the museum. The museum-type system is well-suited in this regard as a type of self-guided tour of the building's attractions.

A significant drawback of the museum-type system is the necessity that the travel route be pre-determined, typically within an enclosed structure. Such a system would not be practical for a large-scale, outdoor "tour," because it would be virtually impossible to pre-set each "display" location, and would also be very difficult for patrons to then find the appropriate displays. A self-guided tour system that does not require pre-set display locations that must be tripped in order to retrieve information, and which was capable of providing tourists with information about an entire city and its sights as the tourists traveled about the area on their own, would be very helpful.

Another example of existing position-sensitive information display systems is that available in newer vehicles that provides an electronic map to the driver. Such a system frequently uses inputs from a satellite global positioning system, or GPS, to transmit locating information to a computer that is onboard the vehicle. Once the driver inputs a desired destination, the on-board computerized map display gives a recommended route to reach the destination. Furthermore, these computerized map systems may provide audio information regarding the proximity of pertinent services, such as gas stations, airports, and others. These computerized maps provide travel muting instructions very well, and this type of system serves this purpose very well.

These computerized map systems do have some deficiencies, however. First, the content of these systems does not typically include historical information or other popular tourist-type information about the surrounding area, but merely practical travel route information. Second, the information available is not arranged hierarchically, i.e. there is only one level of information available, and there is no way to get progressively more detailed information automatically. Furthermore, the video available in these systems is not like a television program, but only an electronic display of the map with reference symbols on it. Finally, these systems do not typically have any provisions for blind users, therefore, only sighted passengers can benefit from the information being presented. A position-sensitive information display system that provides hierarchically-selectable tourist-type information in high-quality video, as well as audio and tactile outputs that is configurable for providing information "on-the-fly" without a manual user request, would be very beneficial.

A further problem with these prior systems is that they do not provide information that is sensitive to the tourist's aspect or directional orientation. All of them only provide information that merely sensitive to the location of the user, and not which direction that the user is facing towards. For a global tour guide application, the information displayed should be responsive to what the user can observe while facing in a particular direction, which is not necessarily the same as the direction of travel. For example, if the user is facing a particular mountain range, information should be made available for display automatically, even if the mountains are far in the distance.

SUMMARY OF THE INVENTION

In light of the aforementioned problems associated with the prior devices, it is an object of the present invention to provide a position-responsive, hierarchically-selectable information presentation system and control program. This system should be interfaceable with various position-determining systems, including satellite global positioning, "GPS," systems. The information should be displayable in a variety of multimedia formats, including video, audio and tactile, such as Braille or other output that can be felt by the touch. A critical object of the present invention is the availability of position-sensitive information automatically, and without manual user request. The displayed information would be available in various levels of detail, with this hierarchical display depending, in part, upon the duration that the user remains at a particular location or below a certain speed or acceleration. A further object of the present invention is to provide information that is sensitive to the directional orientation of the user. Finally, it is an object of the present invention to eliminate the need for pre-staged display locations that must be triggered in order to receive the desired information output.

BRIEF DESCRIPTION OF THE DRAWINGS

The objects and features of the present invention, which are believed to be novel, are set forth with particularity in the appended claims. The present invention, both as to its organization and manner of operation, together with further objects and advantages, may best be understood by reference to the following description, taken in connection with the accompanying drawings, of which:

DETAILED DESCRIPTION OF THE PREFERRED EMBODIMENTS

The following description is provided to enable any person skilled in the art to make and use the invention and sets forth the best modes contemplated by the inventor of carrying out his invention. Various modifications, however, will remain readily apparent to those skilled in the art, since the generic principles of the present invention have been defined herein specifically to provide a position-responsive hierarchically-selectable information presentation system and control program.

Figures 1A, 1B:
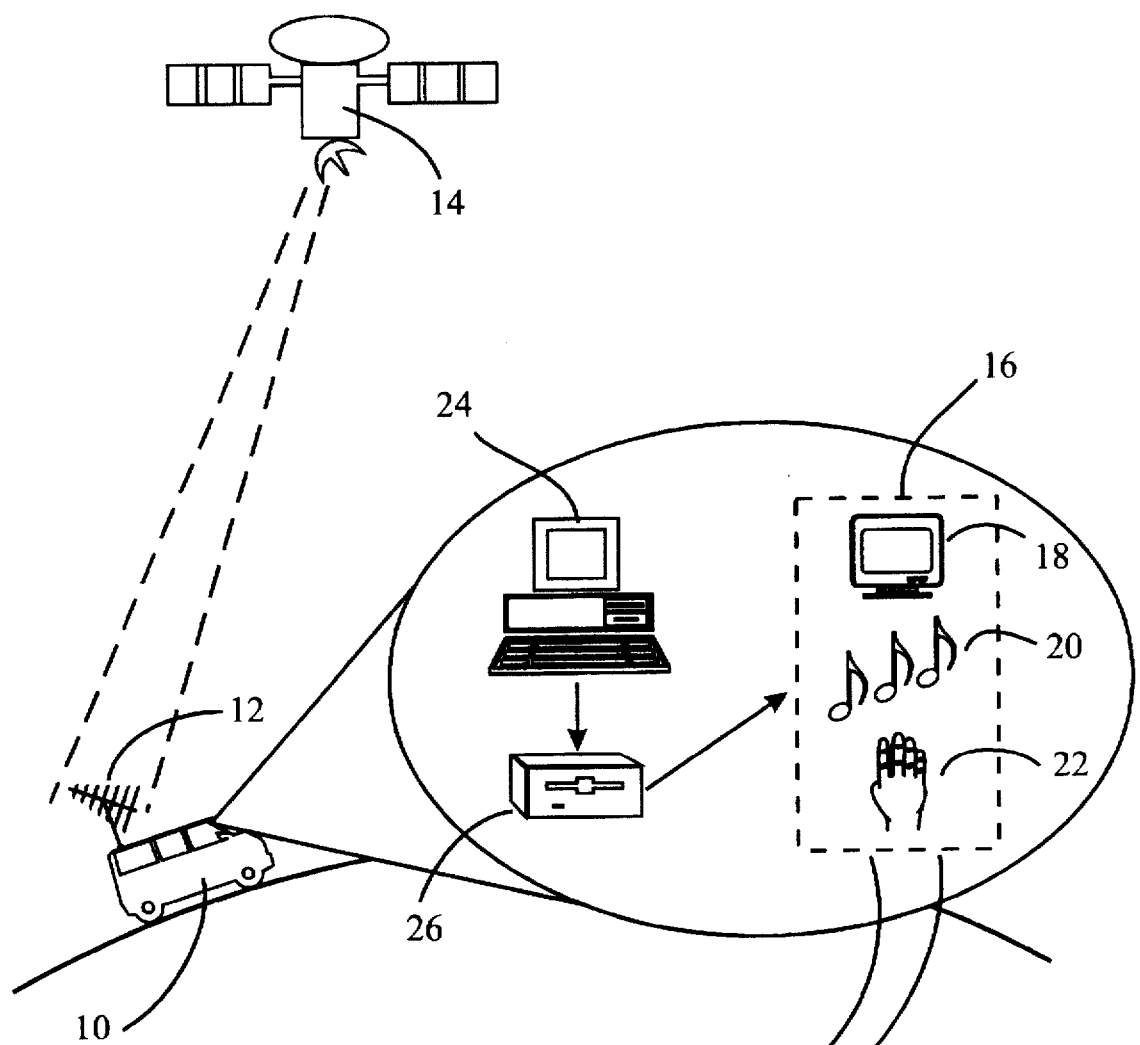
FIG. 1 is a depiction of the operation of one preferred embodiment of the present invention as it might be used in a vehicle.

The present invention can best be understood by initial consideration of FIG. 1. FIG. 1 is a depiction of the operation of one preferred embodiment of the present invention as it might be used in a vehicle 10. In the depicted embodiment, the occupants of the vehicle 10 will be presented with hierarchical multimedia information displays, each as tour-guide information, as the vehicle 10 traverses a particular geography. In such a manner, the vehicle 10 occupants will be able to acquire specific information on many topics about a particular area, such as historical data, geographical information, local services information and many, many others. This information may be presented in increasing detail based upon how long the vehicle 10 lingers in a particular location. The vehicle 10 is not a critical feature of the present invention, and other embodiments may be available for pedestrians, other types of vehicles, and many other applications.

As depicted in FIG. 1, the vehicle 10 includes a position determining means 12, such as an antenna system or other receiver and processor of electronic signals. The example position determining means 12 depicts a system configured to receive satellite positioning data, such as from a satellite global positioning system, or "GPS." In such a system, a satellite 14, or more correctly, a system of satellites (not shown) provides positional data for a particular transceiver, such as by mathematical triangulation. Current GPS-type beating systems are extremely accurate, and can identify the global coordinates of a particular location within a few feet. The position determining means 12 may also be configured to receive velocity and acceleration data, such as from an on-board speedometer (not shown) or accelerometer (not shown). Other configurations of the positioning determining means 12 are possible, including systems relying upon dead reckoning, or even those using pre-established external triggers (perhaps magnetic or metallic pick-ups located at pre-determined sites).

As further depicted in FIG. 1, the system of the present invention may include a presenting means 16 for presenting multimedia information to passengers of the vehicle 10. The content of this multimedia information may be in a variety of forms, depending upon the application involved. As shown, the multimedia content could provide visual 18, audio 20 or tactile 22 information to the user. The visual information 18 could be presented from a monitor or cathode ray robe, a liquid crystal display, a "heads-up-display" or other visual display means. The audio information 20 could be presented from a variety of sound-producing devices, including "speakers" and the like. The tactile information 22 is anticipated to be presented in a variety of forms, to include the sensations of touch or pressure, temperature, and even smell. An example might be to provide a pad that provides a Braille language output to a user laying his or her hand upon the pad. A further example might be to present a representation of a feature that sighted users can see in order to give a vision-impaired user further description of the particular topographical feature, such as a mountain range. Other sensory outputs may be provided, depending upon the particular user application desired.

The selecting means 24 processes the position, velocity and/or acceleration data and selects which data to retrieve from the storage means 26 for presentation via the presenting means 16. The selecting means 24 selects information for presentation in response to the vehicle 10 slowing down or stopping its progress. In such a manner, a user need only to slow down or stop in order to be presented with information for the particular location at which the vehicle 10 resides. A critical feature of the present invention is a hierarchical organization of the multimedia information (See "A," "B," and "C," for example), such that more and more detailed information can be requested merely be staying in a particular location for a longer and longer time. Remaining below a certain velocity and/or acceleration for a predetermined period of time may also trigger the presentation of more detailed information. The selecting means 24 may also be responsive to the directional orientation oft he vehicle 10, such that different information will be displayed, depending upon which direction the vehicle 10 is aligned in. Other inputs to the selecting means 10 may initiate or change the information selected for display, including a manual user request for information.

The selecting means 10 may comprise various devices or systems that provide the aforementioned logical decision-making process, including programmable computers on which a software program is running, or a hardware circuit designed to provide the same logic, among others. As described herein, the selecting means 24 may calculate the vehicle's location, tag particular information for retrieval, and then fetch this information from the storage means 26. Further detail in regard to the decision-making process executed by the selecting means 24 is available below in connection with the discussion for FIG. 3.

The storage means 26, on which the multimedia information is stored, may comprise many different conventional storage devices and systems, including compact disc read-only memory (CD ROM), hard disc, floppy disc, magnetic tape, and solid-state systems, for example.

Figure 2:
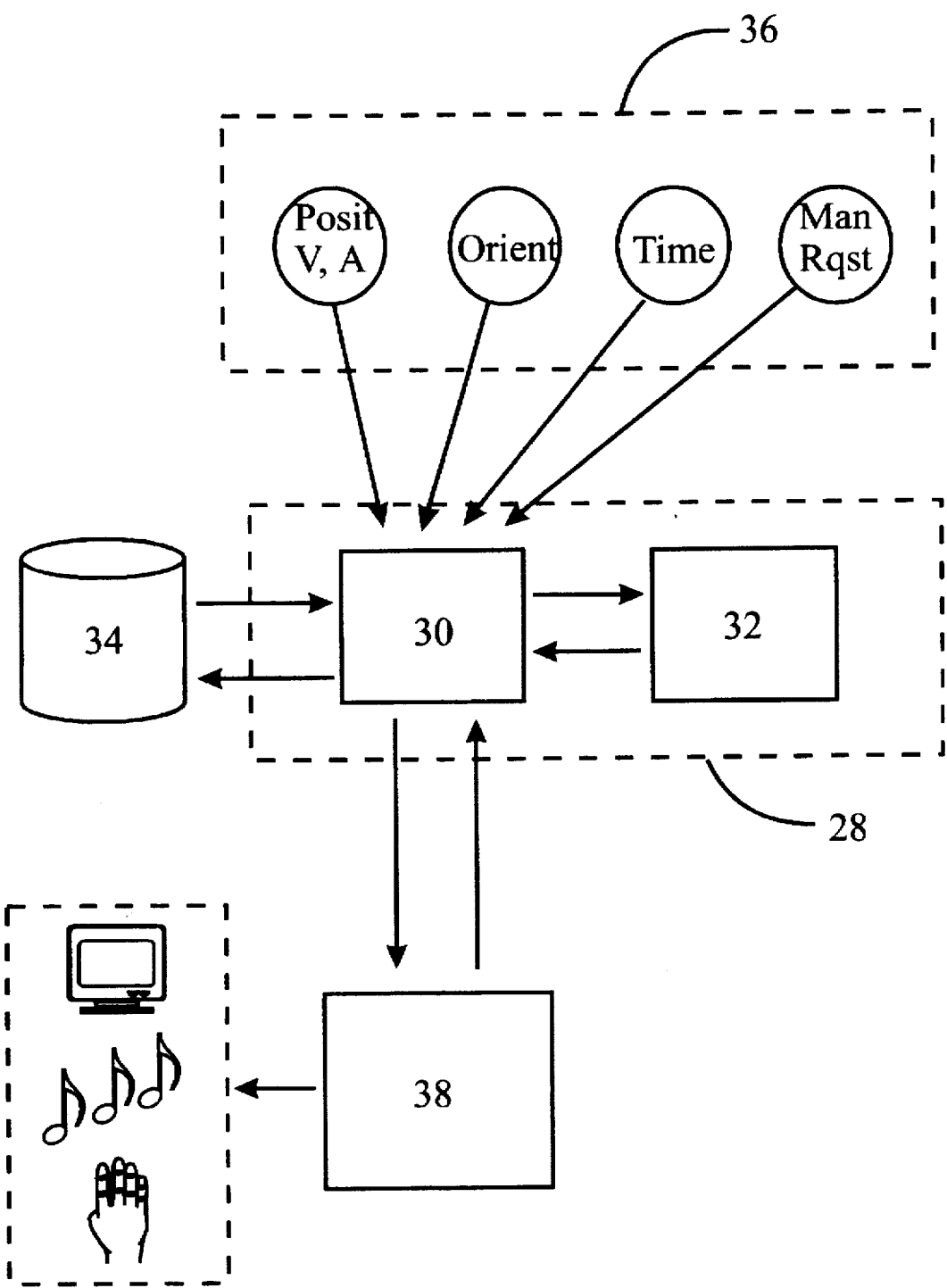
FIG. 2 is a functional diagram of the operation of one preferred embodiment of the present invention.

FIG. 2 is a functional diagram of the operation of one preferred embodiment of the present invention. The depicted embodiment includes a programmable computer 28, comprising a control device 30 and a first storage device 32. The control device 30 is configured and controlled by a control program stored on the first storage device 32. As configured, the control device 30 is operated to select multimedia information stored on a second storage device 34 for presentation to a user. More specifically, the control device 30 performs the function of receiving inputs 36 and calculating whether the user's position, velocity, and/or acceleration has decreased to a pre-determined amplitude, whereupon the control device 30 will access hierarchical multimedia information stored on the second storage device 34 for output a presenting device 38. The control device 30 will also access hierarchical multimedia information in response to a manual user request and may be further responsive to the user's directional orientation.

As described, the control device 30 may be a series of electrical circuits, including at least one microprocessor and provisions for various input and output signals. Other embodiments may comprise different equipment architecture, depending upon the particular application involved. The first storage device 32 may be a hard disc, solid-state memory (i.e. random-access memory—"RAM"), or other conventional media capable of storing a control program. The second storage device 34 may be any of the devices of the first storage device 32, and in particular may be a CD ROM or related device.

As depicted, inputs 36 to the programmable computer 28 may be a user's position, velocity, acceleration, directional orientation, time and/or a manual user request. Not all of these inputs are necessary for all applications, and some may be derived from other inputs to the control device 30. The presenting device 38 may comprise a variety of multimedia information presenting systems that include the ability to output audio, visual and/or tactile information to the user, as is described above in reference to FIG. 1.

Figure 3:
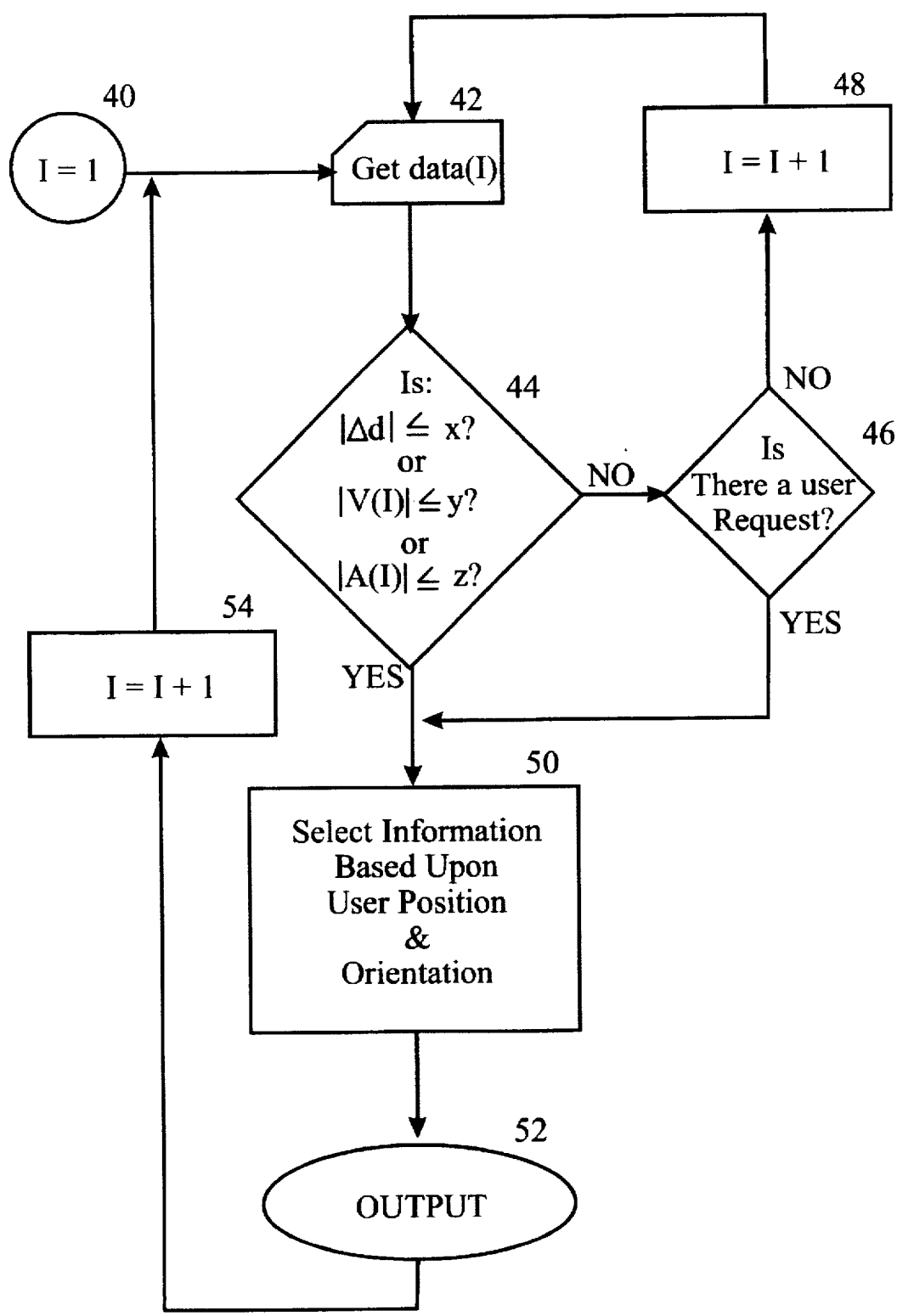
FIG. 3 is a flow chart of essential steps in the process of operating a control device of the present invention.

FIG. 3 is a flow chart of essential steps in the process of operating a control device of the present invention. First beginning at step 40, the counter I is set to 1. Next, step 42 comprises acquiring input dam(I). Dam(I) may be user position, velocity, acceleration, directional orientation and/ or time of data(I) sample. Query step 44 may evaluate data(I) to determine whether the user's position has changed (Ad) less than a pre-set value (x). Such a condition would indicate that the user has substantially stopped. Query step 44 may also evaluate whether the velocity at time(I), (V(I)) has dropped below a pre-set value (y), to indicate that the user has slowed down. Furthermore, query step 44 may evaluate whether the acceleration at time (I), (A(I)) has dropped below a pre-set value (z), to indicate that the user is decelerating.

If none of the queries of step 44 are true, query step 46 will evaluate whether or not the user has made a manual request for information. If there has not been a manual user request, the counter (I) will be incremented, for example by 1, and data retrieval step 42 will be repeated.

If query step 44 or query step 46 is true, process step 50 will be performed, wherein information from a multimedia storage system will be selected based upon the user's position and directional orientation at time(I).

Finally, hierarchical multimedia information selected in process step 50 will be outputted in step 50, via a multimedia information output or presentation system as described in reference to FIGS. 1 and 2. At this point, the counter (I) will be incremented in step 54, and input step 42 will be repeated.

The aforementioned process is only one example of the actual content and order of the critical steps of the present invention. Other processes may be available that will perform the task of selecting hierarchical information for display based upon a user's position, orientation, speed, and/or acceleration versus time.

Figure 4:
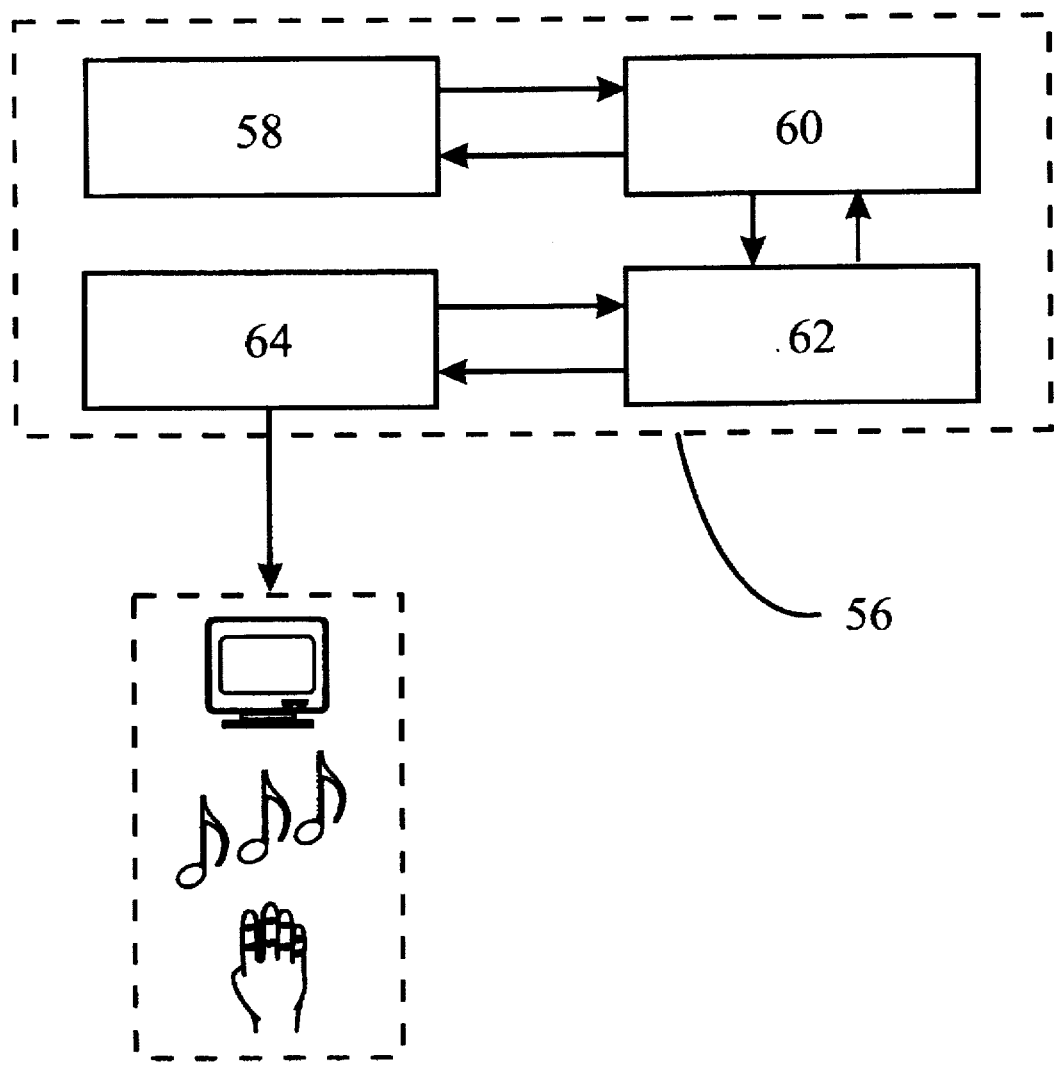
FIG. 4 is a functional diagram of the operation of another preferred embodiment of the present invention.

FIG. 4 is a functional diagram of the operation of another preferred embodiment of the present invention. The method depicted in FIG. 4, for presenting multimedia information to a user includes a programmed computer system 56, comprising at least one input device 58, in communication with a data storage system 60, that is in turn in communication with a processor 62, that is in communication with an output system 64.

The preferred method comprises the steps of receiving input data via the input device 58. The input dam may comprise user position, directional orientation, velocity, acceleration, time and/or whether or not there has been a manual user request. This input data is then stored on the data storage system 60 whereby the processor 62 can compare the input data to other pre-set and calculated data to determine whether the user has slowed down or stopped (or has made a manual request), whereupon the processor 62 will apply the results of the aforementioned comparison to output information contained within the output system 64. The output system 64 will then output the desired hierarchical multimedia output information to the user.

Those skilled in the art will appreciate that various adaptations and modifications of the just-described preferred embodiment can be configured without departing from the scope and spirit of the invention. Therefore, it is to be understood that, within the scope of the appended claims, the invention may be practiced other than as specifically described herein.

What is claimed is:

1. An apparatus for presenting multimedia information to a user, comprising:

position determining means for determining the position of the user;

storage means for storing multimedia information to be presented to the user;

selecting means, responsive to said position determining means and based on the duration the user remains in substantially the same location, for selecting respective stored multimedia information from said storage means to be presented to the user; and presenting means for presenting multimedia information stored in said storage means and selected by said selected means.

2. The apparatus of claim 1, wherein said selecting means further includes:

first calculating means for calculating the duration that the user remains in substantially the same location;

tagging means for tagging stored multimedia information for retrieval, responsive to said first calculating means; and fetching means for fetching information tagged by said tagging means from said storage means.

3. The apparatus of claim 2 further comprising:

a second calculating means for calculating whether user's velocity is below a predetermined amplitude; and said tagging means is further responsive to said second calculating means.

4. The apparatus of claim 3 wherein said presenting means comprises means for presenting audio information to the user.

5. The apparatus of claim 4 wherein said presenting means further comprises means for presenting visual information to the user.

6. The apparatus of claim 5 wherein said presenting means further comprises means for presenting tactile information to the user.

7. The apparatus of claim 6 wherein said position determining means is a receiver of satellite-generated user position and time information.

8. The apparatus of claim 7 wherein said selecting means is further responsive to user direction orientation.

9. The apparatus of claim 8 wherein said selecting means further comprises means for selecting information in response to a manual user request.

10. A control program tangibly stored on a first storage device readable by a programmable control device when coupled to the first storage device, such that the control device is configured and operated by the control program when the first storage device is read by the control device, the configured control device being operated to select multimedia information stored on a second storage device for presentation to a user by a multimedia information presentation device, the control program being configured to operate the control device to perform the function of:

receiving input data for the position of the user at a particular time;

calculating the duration that the user has been in substantially the same position; and accessing multimedia information stored on the second storage device, responsive to the duration that the user has been in the same position, for output by the multimedia information presentation device.

11. The control program of claim 10, wherein:

said receiving further includes input data for the velocity of the user; and said accessing is further responsive to the user's velocity.

12. The control program of claim 11, wherein:

the control program is further configured to operate the control device to perform the function of receiving input data for directional orientation of the user; and said accessing is further responsive to the directional orientation of the user.

13. The control program of claim 12, wherein said accessing is further responsive to manual user request.

14. A method of presenting multimedia information to a user, the method being implemented in a programmed computer system comprising a processor, a data storage system, at least one input device, and at least one output system, the method comprising the steps of:

receiving input data for the programmed computer, the data comprising user position at a particular time;

storing the input data in the data storage system;

applying, to the input data stored in the data storage system, by means of the programmed computer, a step comparing the user position at a current time to the user position at a previous time to provide an indication that the position of the user has been substantially unchanged; and applying output information contained within at least one output system, responsively to whether the user position has been substantially unchanged, to at least one of the output systems.

15. The method of claim 14, wherein said receiving further comprises receiving input data comprising the directional orientation of the user.

16. The method of claim 15, wherein said applying is further responsive to the directional orientation of the user.

17. The method of claim 16, wherein said applying is further responsive to manual user input.

* * * * *